US009268428B2

(12) United States Patent
Kim et al.

(10) Patent No.: US 9,268,428 B2
(45) Date of Patent: Feb. 23, 2016

(54) LIGHT-SENSING APPARATUSES, METHODS OF DRIVING THE LIGHT-SENSING APPARATUSES, AND OPTICAL TOUCH SCREEN APPARATUSES INCLUDING THE LIGHT-SENSING APPARATUSES

(75) Inventors: Young Kim, Yongin-si (KR); I-hun Song, Seongnam-si (KR); Sang-hun Jeon, Seoul (KR); Seung-eon Ahn, Hwaseong-si (KR); Joon-chul Goh, Hwaseong-si (KR); Cheol-gon Lee, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 375 days.

(21) Appl. No.: 13/465,249

(22) Filed: May 7, 2012

(65) Prior Publication Data
US 2013/0027326 A1    Jan. 31, 2013

(30) Foreign Application Priority Data
Jul. 28, 2011    (KR) .......................... 10-2011-0075213

(51) Int. Cl.
*G06F 3/041* (2006.01)
*G06F 3/042* (2006.01)

(52) U.S. Cl.
CPC .............. *G06F 3/0412* (2013.01); *G06F 3/042* (2013.01)

(58) Field of Classification Search
CPC . G06F 3/041–3/042; G09G 3/36; G09G 5/00; H01L 31/18; H01L 31/0264
See application file for complete search history.

(56) References Cited

U.S. PATENT DOCUMENTS

| 5,838,308 | A * | 11/1998 | Knapp et al. .................. 345/173 |
| 2003/0234759 | A1 | 12/2003 | Bergquist |
| 2006/0033016 | A1 | 2/2006 | Ogawa et al. |
| 2006/0060752 | A1 | 3/2006 | Lee et al. |
| 2009/0200088 | A1 | 8/2009 | Chuang |
| 2009/0273580 | A1 * | 11/2009 | Ota et al. ........................ 345/175 |
| 2010/0033450 | A1 * | 2/2010 | Koyama et al. ............... 345/175 |

(Continued)

FOREIGN PATENT DOCUMENTS

| JP | 2001292276 A | 10/2001 |
| JP | 2008312182 A | 12/2008 |

(Continued)

OTHER PUBLICATIONS

Extended European Search Report dated Sep. 2, 2014.

*Primary Examiner* — Tony N Ngo
(74) *Attorney, Agent, or Firm* — Harness, Dickey & Pierce, P.L.C.

(57) ABSTRACT

A light-sensing apparatus in which a light sensor transistor in a light-sensing pixel is formed of an oxide semiconductor transistor for sensing light, a method of driving the light-sensing apparatus, and an optical touch screen apparatus including the light-sensing apparatus. The light-sensing apparatus includes a light-sensing pixel array having a plurality of light-sensing pixels arranged in rows and columns, and a plurality of gate lines which are arranged in a row direction and respectively provide a gate voltage to the light-sensing pixel. Each of the light-sensing pixels includes a light sensor transistor for sensing light and a switch transistor for outputting a light-sensing signal from the light sensor transistor, and gates of the light sensor transistors of the light-sensing pixels arranged in an arbitrary row are connected to a gate line arranged in a row previous or next to the arbitrary row.

29 Claims, 6 Drawing Sheets

(56) References Cited

U.S. PATENT DOCUMENTS

| | | |
|---|---|---|
| 2010/0039406 A1 | 2/2010 | Lee et al. |
| 2010/0097350 A1 | 4/2010 | Choi et al. |
| 2010/0134427 A1 | 6/2010 | Tsai et al. |
| 2011/0063252 A1 | 3/2011 | Chang et al. |
| 2011/0221945 A1* | 9/2011 | Kurokawa ............ G06F 3/0412 348/300 |
| 2012/0280939 A1 | 11/2012 | Ahn et al. |

FOREIGN PATENT DOCUMENTS

| | | |
|---|---|---|
| KR | 2010-0008668 A | 1/2010 |
| KR | 2010-0091852 A | 8/2010 |

* cited by examiner

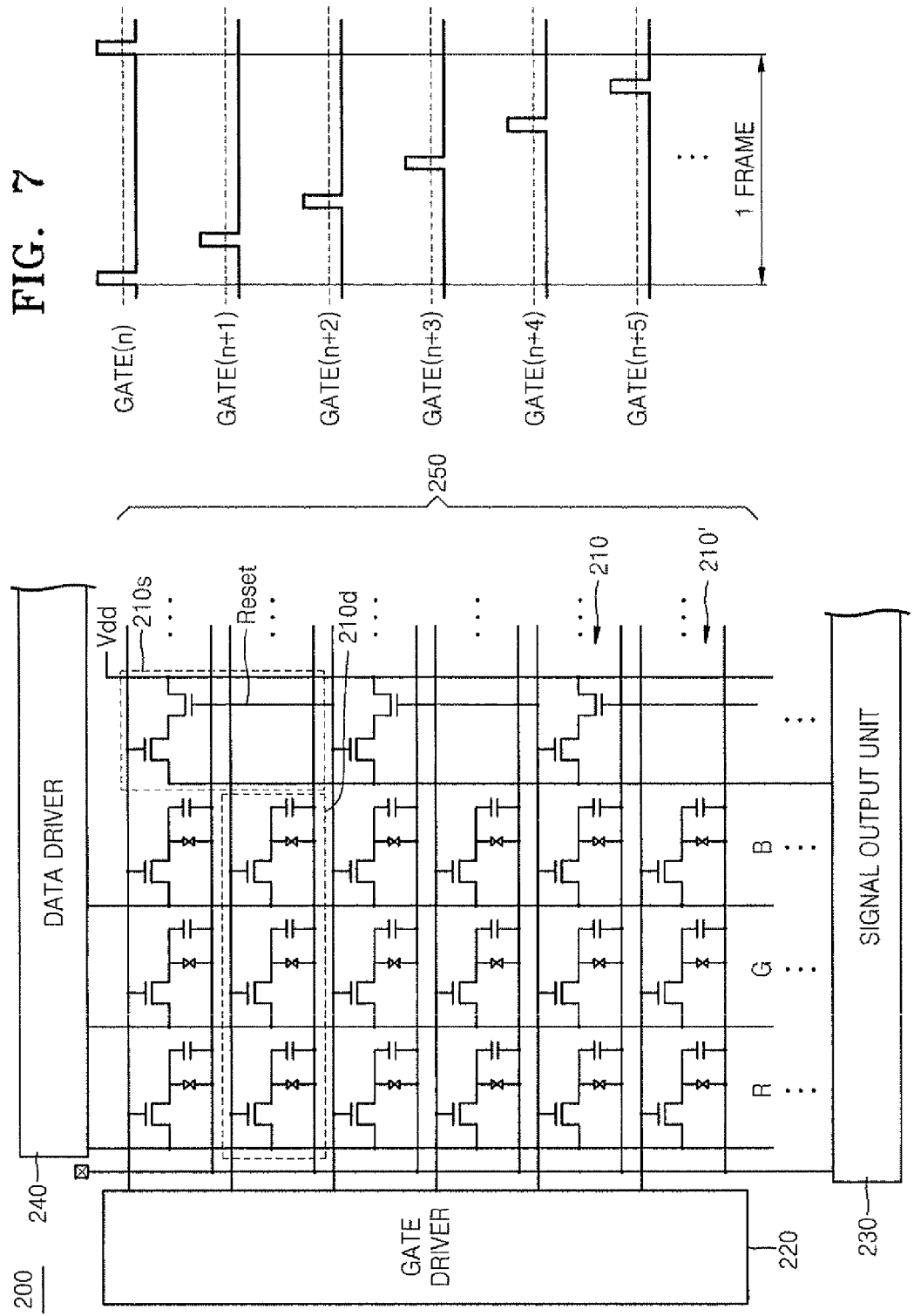

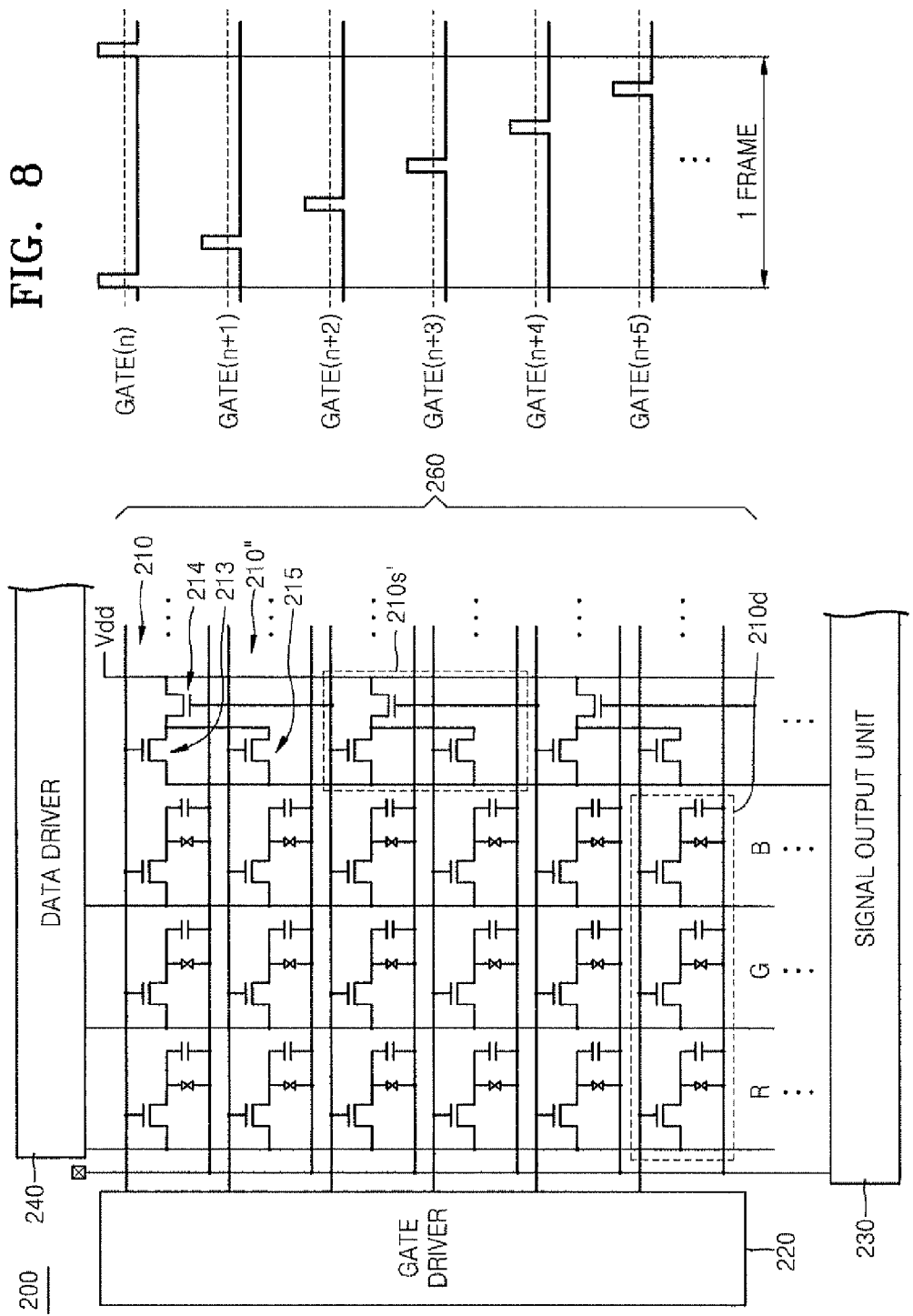

LIGHT-SENSING APPARATUSES, METHODS OF DRIVING THE LIGHT-SENSING APPARATUSES, AND OPTICAL TOUCH SCREEN APPARATUSES INCLUDING THE LIGHT-SENSING APPARATUSES

CROSS-REFERENCE TO RELATED APPLICATION

This application claims priority under 37 U.S.C. §119 to Korean Patent Application No. 10-2011-0075213, filed on Jul. 28, 2011, in the Korean Intellectual Property Office (KIPO), the entire contents of which is incorporated herein in by reference.

BACKGROUND

1. Field

Example embodiments relate to light-sensing apparatuses, methods of driving the light-sensing apparatuses, and optical touch screen apparatuses including the light-sensing apparatuses.

2. Description of the Related Art

A touch screen apparatus is an apparatus for directly receiving input data from a display screen that executes particular software functions by sensing locations of the display screen touched by a hand or a stylus of a user. Generally, a touch screen apparatus is formed by adding a touch panel to a common display panel. Examples of touch panels include resistance film touch panel, electrostatic capacitance touch panel, surface acoustic wave (SAW) touch panel, infrared ray touch panel, piezoelectric touch panel, etc. Recently, such touch screen apparatuses are widely used in various fields as input devices replacing keyboards or mice.

A general touch screen apparatus requires a direct touch on a display screen by a hand or a pen. However, as the size of display apparatus increases, if a distance between a user and a display device increases, it may be difficult to apply such a direct touch. Therefore, an optical touch screen apparatus which may perform the same functions as conventional touch screen apparatuses by sensing light instead of touch by a hand or a pen has been suggested. An optical touch screen apparatus is expected to be useful not only for communication between a user and an apparatus, but also for communication between users.

To embody an optical touch screen apparatus, fine-sized light-sensing devices for sensing light are demanded. An example of generally used light-sensing devices includes an amorphous silicon thin-film transistor (a-Si TFT). However, in a case of an a-Si TFT, the change in current due to light is insufficiently large. Therefore, charges generated by a photodiode during the application of light are accumulated in a capacitor for a predetermined period of time and a signal related to light intensity is generated based on the amount of charges accumulated in the capacitor. In this case, sensing time may be delayed as much as a period of time for accumulating charges in the capacitor, and parasitic capacitance may increase as the size of an optical touch screen apparatus increases.

SUMMARY

Light-sensing apparatuses which employ oxide semiconductor transistors as light-sensing devices and methods of driving the light-sensing apparatuses may be provided. Optical touch screen apparatuses including the light-sensing apparatuses may be provided.

According to example embodiments, a light-sensing apparatus includes a light-sensing pixel array having a plurality of light-sensing pixels arranged in rows and columns and a plurality of gate lines which are arranged in a row direction and respectively provide a gate voltage to the light-sensing pixel. Each of the light-sensing pixels includes a light sensor transistor for sensing light and a switch transistor for outputting a light-sensing signal from the light sensor transistor, and gates of the light sensor transistors of the light-sensing pixels arranged in an arbitrary row are connected to a gate line arranged in a row previous or next to the arbitrary row.

Each of the gate lines may be connected to the light-sensing pixels arranged in the same row. Gates of the switch transistors of the light-sensing pixels arranged in an arbitrary row may be connected to a gate line corresponding to the arbitrary row. The switch transistors and the light sensor transistors may be connected in series. Gates of the light sensor transistors of the light-sensing pixels arranged in an arbitrary row may be connected to a gate line arranged in a row right after the arbitrary row. Gates of the light sensor transistors of the light-sensing pixels arranged in an arbitrary row may be connected to a gate line arranged in a row that is two rows after or more.

The light-sensing apparatus may further include a gate driver which sequentially provides a gate voltage to the plurality of gate lines and a signal output unit which includes a plurality of data lines arranged in a column direction, receives light-sensing signals from the light-sensing pixels, and outputs data signals. Each of the data lines may be connected to the light-sensing pixels arranged in the same column, and a data line corresponding to an arbitrary column may be connected to sources of the switch transistors of the light-sensing pixels arranged in the arbitrary column. The gate driver may include the gate lines in a number which is the same as the number of pixel rows of the light-sensing pixel array and at least one dummy gate line that is only connected to gates of the light sensor transistors of the light-sensing pixels arranged in a previous or a next row. Gates of the light sensor transistors of the light-sensing pixels arranged at least in the last row or in the first row in the light-sensing pixel array may be connected to the dummy gate line. The light sensor transistor may be an oxide semiconductor transistor of which a channel layer is formed of an oxide semiconductor.

According to other example embodiments, an optical touch screen apparatus includes a pixel array having a plurality of display pixels and a plurality of light-sensing pixels that are arranged in rows and columns and a plurality of gate lines which are arranged in a row direction and respectively provide a gate voltage to the display pixels and the light-sensing pixels. Each of the display pixels includes a display cell and a first switch transistor for turning the display cell ON or OFF, each of the light-sensing pixels includes a light sensor transistor for sensing light and a switch transistor for outputting a light-sensing signal from the light sensor transistor, and gates of the light sensor transistors of the light-sensing pixels arranged in an arbitrary row are connected to a gate line arranged in a row previous or next to the arbitrary row.

The optical touch screen apparatus may further include a gate driver which sequentially provides a gate voltage to the plurality of gate lines, a signal output unit which includes a plurality of data lines arranged in a column direction, receives light-sensing signals from the light-sensing pixels, and outputs data signals, and a data driver which includes a plurality of image data lines arranged in a column direction and provides image signals to the display pixels. Each of the gate lines may be connected to the display pixels and the light-sensing pixels arranged in the same row. Gates of the first switch transistors of the display pixels and gates of the second switch transistors of the light-sensing pixels arranged in an arbitrary row may be connected to a gate line corresponding to an arbitrary row.

The second switch transistors and the light sensor transistors may be connected in series. Gates of the light sensor transistors of the light-sensing pixels arranged in an arbitrary row may be connected to a gate line arranged in a row right after the arbitrary row. Gates of the light sensor transistors of the light-sensing pixels arranged in an arbitrary row may be connected to a gate line arranged in a row that is two rows after or more. The optical touch screen apparatus may further include at least one dummy gate line that is only connected to gates of the light sensor transistors. Gates of the light sensor transistors of the first or the last one of the light-sensing pixels arranged in a row direction in the pixel array may be connected to the dummy gate line. The pixel array may include first pixels having both the display pixels and the light-sensing pixels and second pixels having only the display pixels. At least one of the first pixels and at least one of the second pixels may be alternately arranged in a column direction.

According to still other example embodiments, an optical touch screen apparatus includes a pixel array having a plurality of display pixels and a plurality of light-sensing pixels that are arranged in rows and columns and a plurality of gate lines which are arranged in a row direction and respectively provide a gate voltage to the display pixels and the light-sensing pixels. Each of the display pixels includes a display cell and a first switch transistor for turning the display cell ON or OFF, each of the light-sensing pixels includes a light sensor transistor for sensing light, a second switch transistor for outputting a light-sensing signal from the light sensor transistor, and a third switch transistor which outputs a light-sensing signal from the light sensor transistor and is connected to the second switch transistor in parallel, and gates of the light sensor transistors of the light-sensing pixels arranged in an arbitrary row are connected to a gate line arranged in a row previous or next to an arbitrary row.

Each of the gate lines may be connected to the display pixel and the light-sensing pixels arranged in the same row. The pixel array may include first pixels having the display pixels, the second switch transistors, and the light sensor transistors and second pixels having the display pixels and the third switch transistors. At least one of the first pixels and at least one of the second pixels may be alternately arranged in a column direction. A gate line corresponding to a row in which the first pixels are arranged may be connected to gate of the first switch transistors and gate of the second switch transistors, and a gate line corresponding to a row in which the second pixels are arranged may be connected to the gate of the first switch transistors and gate of the third switch transistors. The second switch transistors and the third switch transistors may be arranged in parallel in different rows.

The second switch transistors and the third switch transistors may be all connected to the light sensor transistors in series. Gate of the light sensor transistors may be connected to a gate line of another row in which the second and third switch transistors connected to the light sensor transistors are not arranged. The optical touch screen apparatus may further include at least one dummy gate line connected to only gate of the light sensor transistors. Gates of the light sensor transistors of the first or the last one of the light-sensing pixels arranged in a row direction in the pixel array may be connected to the dummy gate line.

According to further example embodiments, a method of operating a light-sensing apparatus includes in a light-sensing pixel array having a plurality of light-sensing pixels arranged in rows and columns, providing a high voltage to gates of switch transistors of the light-sensing pixels arranged in an arbitrary row and providing a low voltage to gates of switch transistors of the light-sensing pixels arranged in the remaining rows, and providing a high voltage to gates of switch transistors of the light-sensing pixels arranged in a row next to the arbitrary row and providing a low voltage to gates of switch transistors of the light-sensing pixels arranged in the remaining rows. Each of the light-sensing pixels includes a light sensor transistor for sensing light and a switch transistor for outputting a light-sensing signal from the light sensor transistor, a gate line arranged in a row previous or next to an arbitrary row is connected to gates of the light sensor transistors of the light-sensing pixels arranged in the arbitrary row, and while a high voltage is being applied to gates of switch transistors of the light-sensing pixels arranged in the row previous or next to the arbitrary row, the light sensor transistors arranged in the arbitrary row are reset.

The light sensor transistor may be an oxide semiconductor transistor of which a channel layer is formed of an oxide semiconductor. The low voltage may be a voltage between a threshold voltage of the light sensor transistor when no light is incident thereon and a threshold voltage of the light sensor transistor when light is incident thereon. The high voltage may be a threshold voltage of the switch transistor or a voltage for resetting the light sensor transistor, whichever is higher. The switch transistors may include first switch transistors and second switch transistors that are arranged in parallel in different rows. The method may further include outputting light-sensing signals from the light sensor transistors by applying the high voltage to gates of the first switch transistors and outputting light-sensing signals again from the same light sensor transistors by applying the high voltage to gates of the second switch transistors.

According to at least one example embodiment, a light-sensing apparatus includes a light-sensing pixel array including at least four light-sensing pixels in a plurality of rows and a plurality of columns, each of the light-sensing pixels including a light sensor transistor configured to sense light and a switch transistor configured to output a light-sensing signal from the light sensor transistor, and a plurality of gate lines configured to apply a gate voltage to the light sensing pixels, a first gate line in a first row of the plurality of rows connected to gates of a plurality of the light sensor transistors in a second row of the plurality of rows.

According to at least one example embodiment, an optical touch screen apparatus includes a pixel array including a plurality of display pixels in a plurality of rows and columns, each of the display pixels including a display cell and a first switch transistor configured to turn the display cell ON or OFF, and at least one light-sensing pixel in the plurality of rows and the plurality of columns, the light-sensing pixel including a light sensor transistor configured to sense light and a second switch transistor configured to output a light-sensing signal from the light sensor transistor, and a plurality of gate lines extending in a row direction and configured to apply a gate voltage to the display pixels and the light-sensing pixel, a gate of the light sensor transistor in a first row of the plurality of rows being connected to a first gate line in a second row of the plurality of rows.

According to at least one example embodiment, an optical touch screen apparatus includes a pixel array including a plurality of display pixels in a plurality of rows and columns, each of the display pixels including a display cell and a first switch transistor configured to turn the display cell ON or OFF, and at least one light-sensing pixel in the plurality of rows and the plurality of columns, the light-sensing pixel including a light sensor transistor configured to sense light, and second and third switch transistors each configured to output a light-sensing signal from the light sensor transistor, and a plurality of gate lines extending in a row direction and configured to apply a gate voltage to the display pixels and the light-sensing pixel, a gate of the light sensor transistor in a first row of the plurality of rows being connected to a first gate line in a second row of the plurality of rows.

According to at least one example embodiment, a method of operating a light-sensing apparatus includes applying a high voltage to gates of a plurality of switch transistors of light-sensing pixels in a first row of a light-sensing pixel array via a first gate line of the first row, and a low voltage to gates of a plurality of light sensor transistors of the light sensing pixels in the first row via a second gate line of a second row and to gates of switch transistors of light-sensing pixels in rows of the light-sensing pixel array other than the first row, and applying the high voltage to the gates of the plurality of light-sensor transistors in the first row via the second gate line and to gates of a plurality of switch transistors of light-sensing pixels in the second row via the second gate line, and the low voltage to gates of switch transistors of light-sensing pixels in rows of the light-sensing pixel array other than the second row.

According to at least one example embodiment, an optical touch screen apparatus includes a light sensing apparatus with a light-sensing pixel array including at least four light-sensing pixels in a plurality of rows and a plurality of columns, each of the light-sensing pixels including a light sensor transistor configured to sense light and first and second switch transistors configured to output a light-sensing signal from the light sensor transistor, a display apparatus with a display pixel array including a plurality of display pixels in the plurality of rows and the plurality of columns, each of the display pixels including a display cell and a third switch transistor configured to turn the display cell ON or OFF, and a plurality of gate lines extending in a row direction and configured to apply a gate voltage to the display pixels and the light-sensing pixels, a gate of one of the light sensor transistors in a first row of the plurality of rows being connected to a first gate line in a second row of the plurality of rows.

According to at least one example embodiment, an optical touch screen pixel array includes first and second switching transistors in a first row, a first light sensor transistor in a second row, and a first gate line connected to the first and second switching transistors, and to the first light sensor transistor.

BRIEF DESCRIPTION OF THE DRAWINGS

Example embodiments will be more clearly understood from the following brief description taken in conjunction with the accompanying drawings. FIGS. 1-8 represent non-limiting, example embodiments as described herein.

FIG. 1 is a schematic cross-sectional diagram illustrating oxide semiconductor transistors according to example embodiments;

FIGS. 2 and 3 are graphs illustrating operational characteristics of an oxide semiconductor transistor illustrated in FIG. 1;

FIG. 4 is a circuit diagram illustrating pixels of a light-sensing apparatus including oxide semiconductor transistors according to at least one example embodiment;

FIG. 5 is a schematic block diagram illustrating light-sensing apparatuses which may provide a gate voltage and a reset signal via a single driving circuit according to some example embodiments;

FIG. 6 is a circuit diagram illustrating pixels of an in-cell type optical touch screen apparatus;

FIG. 7 is a block diagram illustrating circuit structures of in-cell type optical touch screen apparatuses including at least one of the pixels illustrated in FIG. 6; and FIG. 8 is a block diagram illustrating circuit structures of in-cell type optical touch screen apparatuses according to further example embodiments.

Figure 1:
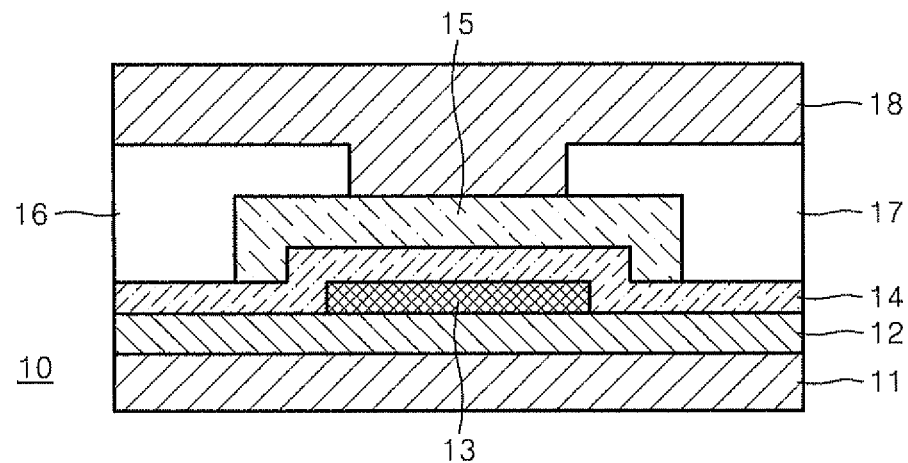

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/ or structural elements may be reduced or exaggerated for clarity. The use of similar or identical reference numbers in the various drawings is intended to indicate the presence of a similar or identical element or feature.

DETAILED DESCRIPTION

Example embodiments will now be described more fully with reference to the accompanying drawings, in which example embodiments are shown. Example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

An oxide semiconductor transistor may be a transistor including a channel formed of an oxide semiconductor. Oxide semiconductor transistors may be sensitive to light according to a type of oxide semiconductor used for a channel layer. In a case where a channel layer is formed of an oxide semiconductor sensitive to light, the threshold voltage and drain current of the oxide semiconductor transistor may change according to the wavelength or intensity of incident light, and thus the oxide semiconductor transistor may be used as a light-sensing device.

FIG. 1 is a schematic cross-sectional diagram illustrating oxide semiconductor transistors according to example embodiments. Referring to FIG. 1, the oxide semiconductor transistor 10 may include a substrate 11. An insulation layer 12 may be on the substrate 11 to cover the substrate 11. A gate 13 may be on a portion of the insulation layer 12. A gate insulation layer 14 may be on the insulation layer 12 and the gate 13 and may cover at least the surroundings of the gate 13. A channel layer 15 may be on the gate insulation layer 14. A source 16 and a drain 17 may respectively cover two ends of the channel layer 15 (e.g., opposite ends). A transparent insulation layer 18 may completely cover the source 16, the drain 17, and the channel layer 15. Although FIG. 1 Illustrates that the oxide semiconductor transistor 10 may be a bottom-gate type oxide semiconductor transistor in which the gate 13 is below the channel layer 15, the oxide semiconductor transistor 10 may also be a top-gate structure.

The substrate 11 may include common substrate materials, for example, glass and/or silicon. The substrate 11 may be, for example, a bulk semiconductor, a support layer and/or an epitaxial layer. The insulation layer 12, the gate insulation layer 14, and the transparent insulation layer 18 may include an oxide (e.g., $SiO_2$), for example. If the substrate 11 is an insulation material, the insulation layer 12 may be omitted. The gate 13, the source 16, and the drain 17 may include, for example, a conductive metal and/or a conductive metal oxide. For example, if it is desired for the oxide semiconductor transistor 10 to be transparent, the gate 13, the source 16, and the drain 17 may include a transparent conductive material (e.g., indium tin oxide (ITO)). If it is not desired for the oxide semiconductor transistor 10 to be transparent, the substrate 11, the insulation layer 12, the gate 13, the gate insulation layer 14, the source 16, and the drain 17 may not include transparent materials.

The channel layer 15 may include an oxide semiconductor material. According to oxide semiconductor materials that may constitute the channel layer 15, the oxide semiconductor transistor 10 may be light sensitive. Oxide semiconductor materials may include any oxide semiconductor (e.g., ZnO, InO, SnO, InZnO, ZnSnO, and/or InSnO), or a mixture of an oxide semiconductor and one or more of other materials (e.g., Hf, Zr, Ti, Ta, Ga, Nb, V, Al and/or Sn). The threshold voltage and drain current of the oxide semiconductor transistor 10 shown in FIG. 1 may change according to the wavelength or intensity of incident light, and the oxide semiconductor transistor 10 may be used as a light-sensing device. The channel layer 15 may be a single oxide semiconductor layer or may have a multi-layer structure.

Figure 2:
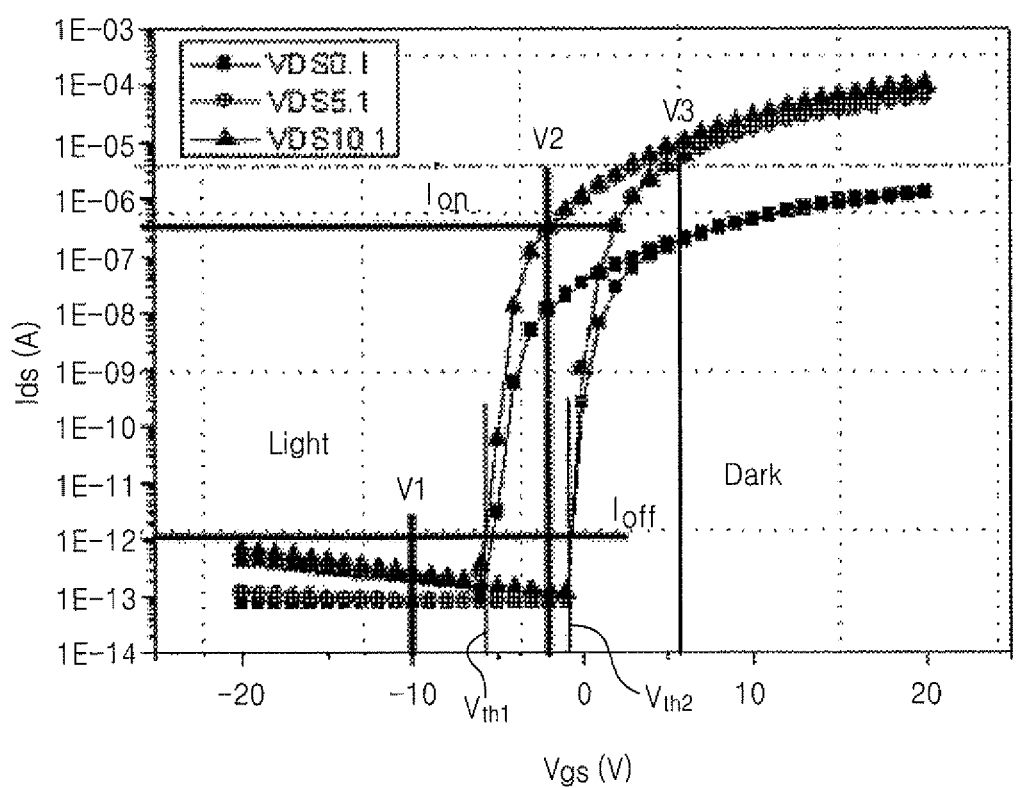
Figure 3:
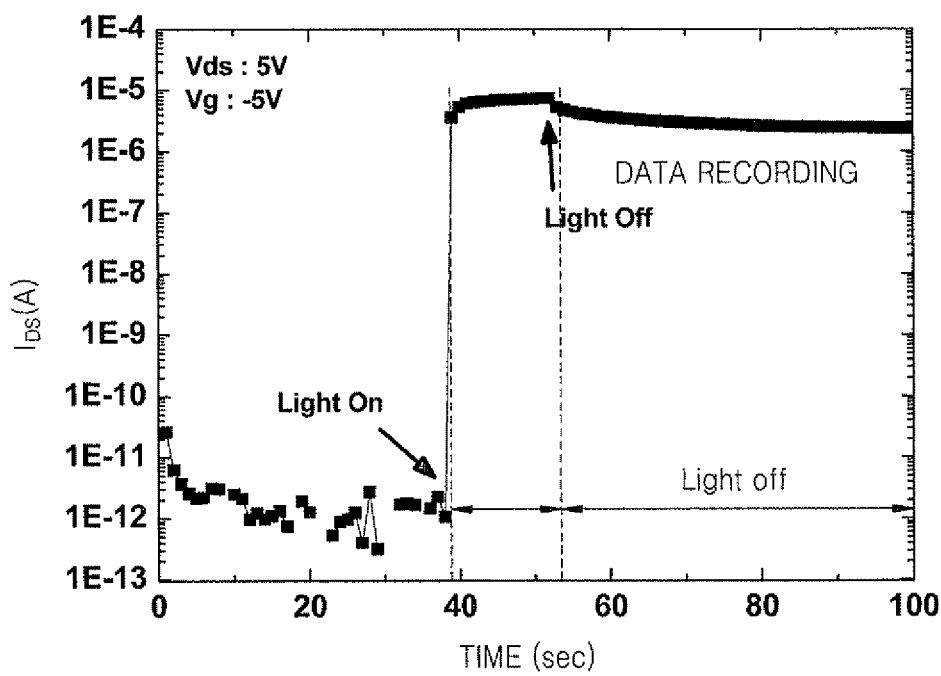

FIGS. 2 and 3 are graphs illustrating operational characteristics of an oxide semiconductor transistor 10 illustrated in FIG. 1. FIG. 2 illustrates a drain current Ids as a function of a gate voltage Vgs of an oxide semiconductor transistor 10. Referring to FIG. 2, when light is incident on an oxide semiconductor transistor 10, a threshold voltage of the oxide semiconductor transistor 10 may be shifted overall in a negative direction. For example, when no light is incident on the oxide semiconductor transistor 10, the threshold voltage of the oxide semiconductor transistor 10 may be Vth2. When light is incident on the oxide semiconductor transistor 10, the threshold voltage of the oxide semiconductor transistor 10 may be Vth1. If a gate voltage V2 between the threshold voltages Vth1 and Vth2 is applied to the oxide semiconductor transistor 10, the oxide semiconductor transistor 10 may be turned OFF and a relative low drain current flows when no light is incident thereon (Dark), whereas the oxide semiconductor transistor 10 may be turned ON and a relatively high drain current flows when light is incident thereon (Light).

If a gate voltage V1 lower than the threshold voltages Vth1 and Vth2 is applied to the oxide semiconductor transistor 10, the oxide semiconductor transistor 10 may be OFF regardless of the presence of light. If a gate voltage V3 higher than the threshold voltages Vth1 and Vth2 is applied to the oxide semiconductor transistor 10, the oxide semiconductor transistor 10 may be turned ON regardless of the presence of light.

It may be determined whether light is incident on the oxide semiconductor transistor 10 or not by applying a gate voltage V2 to the oxide semiconductor transistor 10 and measuring a drain current. In a case of the oxide semiconductor transistor 10, a current ratio $I_{ON}/I_{OFF}$ between a drain current when light is incident and a drain current when no light is incident may be fairly large.

If the oxide semiconductor transistor 10 with the properties as described above is used as a light-sensing device, various merits may be expected. For example, because on/off current ratio of the oxide semiconductor transistor 10 may be large, if the oxide semiconductor transistor 10 is used as a light-sensing device, a very simple light-sensing apparatus without a capacitor may be implemented. The size of the light-sensing apparatus 100 may be increased. Furthermore, the driving speed of the light-sensing apparatus 100 may be improved, while the amount of power consumed by the light-sensing apparatus 100 may be reduced.

FIG. 3 is a graph illustrating a change in drain current over time after light is incident on an oxide semiconductor transistor 10 while the voltage V2 (e.g., −5V) between the threshold voltages Vth1 and Vth2 is being applied to the oxide semiconductor transistor 10. Referring to FIG. 3, light may be incident on the oxide semiconductor transistor 10 at about the 40 second mark and the drain current increases. Even if the incidence of light is stopped at about the 55 second mark, the drain current barely decreases. The oxide semiconductor transistor 10 may include a memory function with respect to incident of light. This phenomenon may be caused as charges are trapped within or on an interface of the channel layer 15 of the oxide semiconductor transistor 10.

For example, a negative gate voltage may be applied to the oxide semiconductor transistor 10 together with light and holes generated in the channel layer 15 by the light may move to the interface between the gate insulation layer 14 and the channel layer 15 and may be trapped therein. The trapped charges may not be removed until a sufficiently large voltage (e.g., positive voltage) is applied to the gate. Once charges are trapped, drain current may not decrease even if the incident light is stopped. This phenomenon may disappear when trapped charges are removed by applying a sufficiently large gate voltage (e.g., positive voltage) to the oxide semiconductor transistor 10.

Figure 4:
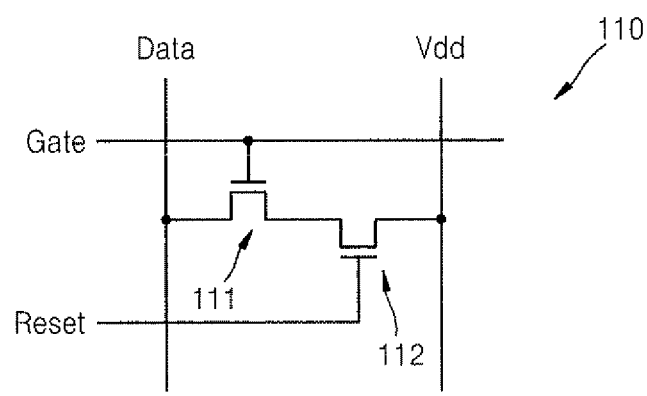

FIG. 4 is a circuit diagram illustrating pixels of a light-sensing apparatus including an oxide semiconductor transistor according to at least one example embodiment. Referring to FIG. 4, a light-sensing pixel 110 may include one light sensor transistor 112 and one switch transistor 111 connected in series. A source of the light sensor transistor 112 may be connected to a drain of the switch transistor 111. The light sensor transistor 112 may be a light-sensing device for sensing light and may be the oxide semiconductor transistor 10, for example. The switch transistor 111 for outputting a light-sensing signal may be a general thin-film transistor (TFT) with no light sensitivity. The light-sensing pixel 110 may include a gate line Gate that may be connected to a gate of the switch transistor 111, a data line Data that may be connected to a source of the switch transistor 111, a driving voltage line Vdd that may be connected to a drain of the light sensor transistor 112, and a reset line Reset that may be connected to a gate of the light sensor transistor 112.

In a light-sensing pixel 110, if a gate voltage is applied to the switch transistor 111 via the gate line Gate, the switch transistor 111 may be turned ON. A current may flow from the source of the light sensor transistor 112 to the data line Data. An amount of the current flowing from the light sensor transistor 112 to the data line Data may change according to the intensity of light incident on the light sensor transistor 112. The intensity of light incident on the light sensor transistor 112 may be calculated by measuring an amount of a current flowing through the data line Data. While the switch transistor 111 is ON for outputting a light-sensing signal, the voltage V2 (refer to FIG. 2) may be applied to the gate of the light sensor transistor 112.

When the voltage V1 or the voltage V3 is applied to the gate of the light sensor transistor 112, the light sensor transistor 112 may be turned OFF or ON regardless of the incidence of light. While no gate voltage is applied to the switch transistor 111, the switch transistor 111 may be turned OFF, and thus no current may flow in the data line Data. A light-sensing signal may be output from the light-sensing pixel 110 by controlling the switch transistor 111. Light incident on the light sensor transistor 112 may be detected and the intensity of the light may be determined based on the intensity of the light-sensing signal.

To perform a subsequent light measurement after a current measurement of the light-sensing pixel 110, a reset signal for removing trapped charges may be applied. A reset operation may include applying a reset signal (e.g., a positive reset signal) to the light sensor transistor 112. The reset line Reset connected to the gate of the light sensor transistor 112 may be a line for resetting the light sensor transistor 112 prior to a subsequent measurement by applying a positive voltage the light sensor transistor 112. For example, after a light-sensing signal is read out from the light-sensing pixel 110 by controlling the switch transistor 111 via the gate line Gate, a positive reset signal may be applied to the gate of the light sensor transistor 112 via the reset line Reset.

The light-sensing apparatus may include a driving circuit for applying a gate voltage to the switch transistor 111 of the light-sensing pixel 110 and for applying a reset signal to the light sensor transistor 112. If a driving circuit for applying a gate voltage to the switch transistor 111 and a driving circuit for applying a reset signal to the light sensor transistor 112 exist separately, the overall circuit configuration of the light-sensing apparatus may become complicated. If a resolution of the light-sensing apparatus increases, there may be insufficient space for arranging a plurality of driving circuits. According to example embodiments, a single driving circuit may provide both a gate voltage and a reset signal.

Figure 5:
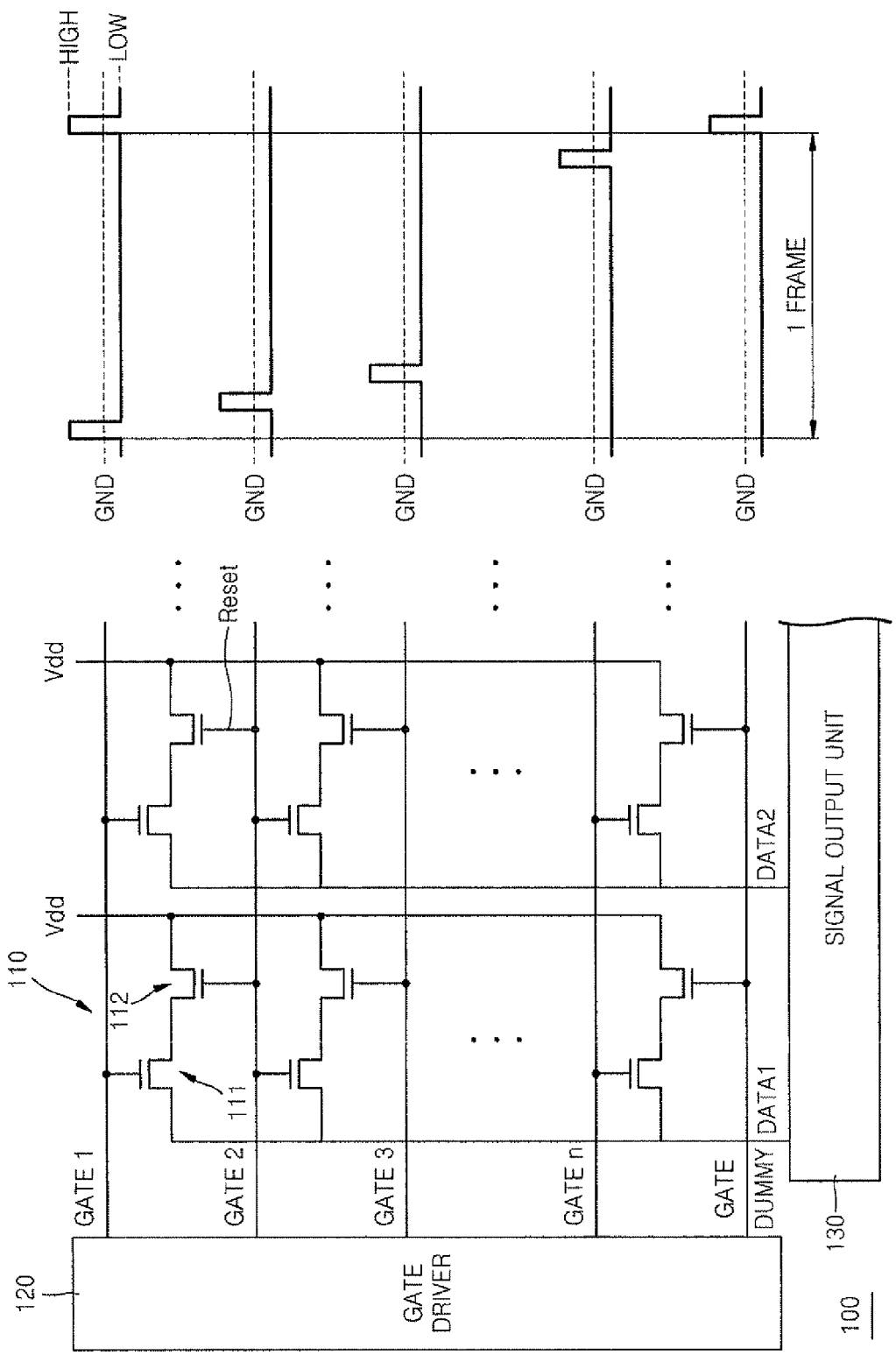

FIG. 5 is a schematic block diagram illustrating light-sensing apparatuses which may provide a gate voltage and a reset signal via a single driving circuit according to some example embodiments. Referring to FIG. 5, a light-sensing apparatus 100 may include a light-sensing pixel array with a plurality of light-sensing pixels 110 to sense incident light, a gate driver 120 to sequentially provide a gate voltage and a reset signal to each of the light-sensing pixels 110, and a signal output unit 130 to receive a light-sensing signal from each of the light-sensing pixels 110 and outputting a data signal. The light-sensing pixels 110 in the light-sensing pixel array may be in rows and columns. For example, the light-sensing pixels 110 may be in an array of n rows and m columns. Herein, n and m may each represent any positive integer.

The gate driver 120 may activate each of the light-sensing pixels 110 individually and may control each of the light-sensing pixels 110 to output a light-sensing signal. The gate driver 120 may include first to n gate lines (Gate 1, Gate 2, . . . , Gate n) in a row direction. Each of the gate lines Gate 1, Gate 2, . . . , Gate n may be connected to a gate of switch transistors 111 of the light-sensing pixels 110 in a same row. For example, the first gate line Gate 1 may be connected to a gate of the switch transistors 111 of the light-sensing pixels 110 in a first row. An n$^{th}$ gate line Gate n may be connected to gates of the switch transistors 111 of the light-sensing pixels 110 in an n$^{th}$ row.

The signal output unit 130 may receive light-sensing signals from the light-sensing pixels 110 and may output data signals. The signal output unit 130 may include first to n data lines (Data 1, Data 2, ..., Data n) in a column direction. Each of the first to n data lines Data 1, Data 2, ..., Data n may be connected to sources of the switch transistors 111 of the light-sensing pixels 110 in the same column. For example, the first data line Data 1 may be connected to sources of the switch transistors 111 of the light-sensing pixels 110 in a first column, and the second data line Data 2 may be connected to sources of the switch transistors 111 of the light-sensing pixels 110 in a second column. In this structure, the signal output unit 130 may receive all light-sensing signals generated by the plurality of light-sensing pixels 110 in the same row simultaneously via the first to n data lines Data 1, Data 2, ..., Data n.

For example, a gate voltage may be applied to the first gate line Gate 1 and all light-sensing signals generated by the light-sensing pixels 110 in the first row may be simultaneously input to the signal output unit 130. The signal output unit 130 may be configured to convert the light-sensing signals into digital data signals and sequentially output the digital data signals by column. The reset line Reset for resetting the light sensor transistor 112 in the light-sensing pixel 110 may be interconnected between a gate of the light sensor transistor 112 of a previous row and a gate line of a next row. For example, a gate of the light sensor transistor 112 in the light-sensing pixel 110 be arranged in the first row may be connected to the second gate line Gate 2 via the reset line Reset. A gate of the light sensor transistor 112 in the light-sensing pixel 110 in the second row may be connected to the third gate line Gate 3 via the reset line Reset.

To provide a reset signal to a gate of the light sensor transistor 112 in the light-sensing pixel 110 in the last (n$^{th}$) row, the gate driver 120 may include a dummy gate line Gate Dummy. The dummy gate line Gate Dummy may be in a row next to the n$^{th}$ gate line Gate n, may not be connected to gate of the switch transistors 111, and may only be connected to gates of the light sensor transistors 112 of the light-sensing pixels 110 in the n$^{th}$ row via the reset line Reset.

FIG. 5 may illustrate that a gate of the light sensor transistor 112 in an arbitrary row may be connected to the gate line of a next row as an example. According to example embodiments, a gate of the light sensor transistor 112 in an arbitrary row may also be connected to the gate line of a row that may be two or more rows after the arbitrary row. For example, a gate of the light sensor transistor 112 in the first row may be connected to a gate of the light sensor transistor 112 in the third row, and a gate of the light sensor transistor 112 in the second row may be connected to gate of the light sensor transistor 112 in the fourth row. In this case, there may be two dummy gate lines that may not be connected to the switch transistor 111 and may only be connected to the light sensor transistor 112. For example, the first dummy gate line in a row right next to the n$^{th}$ row may be connected to a gate of the light sensor transistor 112 in the (n−1)$^{th}$ row, and the second dummy gate line next to the first dummy gate line may be connected to a gate of the light sensor transistor 112 in the n$^{th}$ row.

The right part of FIG. 5 is a timing diagram illustrating an operation of a light-sensing apparatus 100. Referring to the timing diagram of FIG. 5, the gate driver 120 may apply a high voltage HIGH (that is, a voltage equal to or greater than a threshold voltage of the switch transistor 111) to the first gate line Gate 1, so that the light-sensing pixels 110 in the first row output light-sensing signals. Low voltages LOW may be applied to the remaining gate lines, for example, the second gate line Gate 2 through the dummy gate line Gate Dummy. No light-sensing signal may be output by the light-sensing pixels 110 in the remaining rows. A low voltage LOW may be also applied to a gate of the light sensor transistor 112 in the first row that may be connected to the second gate line Gate 2 via the reset line Reset. As described above, while a light-sensing signal is being output, a voltage V2 may be applied to the gate of the light sensor transistor 112. The low voltage LOW may be the voltage V2 between a threshold voltage of the light sensor transistor 112 when no light is incident thereon and a threshold voltage of the light sensor transistor 112 when light is incident thereon.

The gate driver 120 may apply the high voltage HIGH to the second gate line Gate 2, so that the light-sensing pixels 110 in the second row output light-sensing signals. The low voltage LOW may be applied to the remaining gate lines, for example, the first gate line Gate 1 and the third gate line Gate 3 through the dummy gate line Gate Dummy. The high voltage HIGH may also be applied to a gate of the light sensor transistor 112 in the first row that may be connected to the second gate line Gate 2 via the reset line Reset. The high voltage HIGH may be a voltage sufficient to reset the light sensor transistor 112 (e.g., the voltage V3 of FIG. 2). The high voltage HIGH may be a threshold voltage of the switch transistor 111 and/or a voltage for resetting the light sensor transistor 112 (the highest of the two if they are different). While light-sensing signals are being output by the light-sensing pixels 110 in the second row, the light sensor transistors 112 in the light-sensing pixels 110 in the first row may be reset.

Light-sensing signals may be sequentially output from the light-sensing pixels 110, from the first row to the n$^{th}$ row. A light sensing operation for a single frame may be completed. Light sensing operations for next frames may be repeated in the order as described above. After light-sensing signals are output by the light-sensing pixels 110 in the last n$^{th}$ row, the gate driver 120 may apply the high voltage HIGH to the dummy gate line Gate Dummy to reset the light sensor transistors 112 in the n$^{th}$ row. The high voltage HIGH may be applied to gate of the light sensor transistors 112 in the n$^{th}$ row that may be connected to the dummy gate line Gate Dummy via the reset line Reset, and the light sensor transistors 112 in the n$^{th}$ row may be reset. A time point for applying the high voltage HIGH to the dummy gate line Gate Dummy and a time point for applying the high voltage HIGH to the first gate line Gate 1 may be the same. According to at least one example embodiment, the high voltage HIGH may be applied to the first gate line Gate 1 for a next frame after the high voltage HIGH is completely applied to the dummy gate line Gate Dummy.

According to example embodiments, a gate line of a row may be connected to the switch transistors 111 in the same row and the light sensor transistors 112 in the previous row. While light-sensing signals are being output by the light-sensing pixels 110 in a row, the light sensor transistors 112 in the previous row may be reset. The light-sensing apparatus 100 according to example embodiments may perform a switching operation of the switch transistors 111 and the resetting operation of the light sensor transistors 112 via the single gate driver 120. No separate driving circuits for individually driving the switch transistor 111 and the light sensor transistor 112 are necessary. The configuration of the light-sensing apparatus 100 may be simplified, and effects, for example improved space utilization, reduced manufacturing cost, and reduced power consumption, may be achieved. Due to the space utilization, it may be easy to embody an in-cell type optical touch screen apparatus in which display pixels and light-sensing pixels may be integrated.

Figure 6:
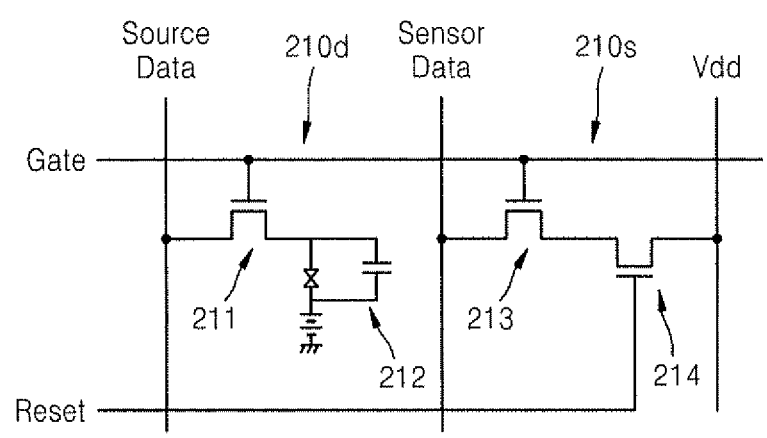

FIG. 6 is a circuit diagram illustrating pixels of an in-cell type optical touch screen apparatus. Referring to FIG. 6, a pixel 210 of an in-cell type optical touch screen apparatus may include a display pixel 210d and a light-sensing pixel 210s. The display pixel 210d may include a display cell 212 (e.g., a liquid crystal cell in the case of a liquid crystal display apparatus) and a first switch transistor 211 for turning the display cell 212 on or off. The light-sensing pixel 210s may include a light sensor transistor 214 for sensing incident light and a second switch transistor 213 for outputting a light-sensing signal from the light sensor transistor 214. The first and second switch transistors 211 and 213 may be connected to a single gate line Gate. A drain of the first switch transistor 211 may be connected to an image data line Source Data, whereas a source of the first switch transistor 211 may be connected to the display cell 212. A source of the second switch transistor 213 may be connected to a light-sensing data line Sensor Data, whereas a drain of the second switch transistor 213 may be connected to a source of the light sensor transistor 214. A drain of the light sensor transistor 214 may be connected to a driving voltage line Vdd, whereas a gate of the light sensor transistor 214 may be connected to the reset line Reset.

FIG. 7 is a block diagram illustrating a circuit structure (e.g., an entire circuit structure) of in-cell type optical touch screen apparatuses including at least one the pixels illustrated in FIG. 6. Referring to FIG. 7, an in-cell type optical touch screen apparatus 200 may include a pixel array 250 including display pixels 210d to display images and light-sensing pixels 210s to sense incident light, a gate driver 220 to provide a gate voltage to each of the display pixels 210d and the light-sensing pixels 210s, a data driver 240 to provide an image signal to each of the display pixels 210d, and a signal output unit 230 to receive a light-sensing signal from each of the light-sensing pixels 210s and output a data signal. Each of the display pixels 210d may include a red sub-pixel R, a green sub-pixel G, and a blue sub-pixel B for displaying colors.

In the pixel array 250, the display pixels 210d and the light-sensing pixels 210s may be in rows and columns of an array. Even though it may be possible that one light-sensing pixel 210s may be arranged with respect to each of the display pixels 210d, one light-sensing pixel 210s may be arranged with respect to a plurality of display pixels 210d. In a general display panel, a width and height of one pixel may be about 200 μm to about 300 μm, whereas a beam diameter of incident light may be significantly larger, for example, about 2 mm. Even if the light-sensing pixels 210s are only partially arranged in the pixel array 250, a location at which light is incident may be specified.

FIG. 7 illustrates an example in which one light-sensing pixel 210s may be arranged with respect to two display pixels 210d. For example, referring to FIG. 7, the pixel array 250 may include the pixels 210 with both the display pixels 210d and the light-sensing pixels 210s and pixels 210' with only the display pixels 210d. The pixels 210' and the pixels 210 may alternate in a row direction. Although FIG. 7 shows an example in which one light-sensing pixel 210s may be arranged with respect to two display pixels 210d, according to other example embodiments, one light-sensing pixel 210s may be arranged with respect to a number of display pixels 210 that may be less or greater than 2. In a case where the light-sensing pixels 210s are arranged with respect to a part of the display pixels 210d, the width of the light sensor transistor 214 (see FIG. 6) in the light-sensing pixel 210s may be increased correspondingly. For example, the width of the light sensor transistor 214 may be increased into an empty region of the pixel 210' without the light-sensing pixel 210s. The sensitivity of one light sensor transistor 214 may be increased in correspondence to the increased width of the light sensor transistor 214.

The gate driver 220 may include a plurality of gate lines in a row direction. Each of the gate lines may be connected to gates of first switch transistors 211 in all display pixels 210d arranged in the same row and gates of second switch transistors 213 in all light-sensing pixels 210s arranged in the same row. In a case where the display pixel 210d may include three sub-pixels R, G, and B, the display pixel 210d may include three first switch transistors 211. A gate line may be connected to gates of the three first switch transistors 211. For convenience of explanation, FIG. 7 illustrates only the $n^{th}$ gate line through $(n+5)^{th}$ gate line. Example embodiments are not so limited and the gate driver 220 may include the gate lines in a number which may be the same as the number of the pixel rows of the pixel array 250 and at least one dummy gate line that is only connected to the light sensor transistors 214.

The signal output unit 230 may include a plurality of light-sensing data lines Sensor Data in a column direction. Each of the light-sensing data lines may be connected to all the light-sensing pixels 210s in the same column. Each of the light-sensing data lines may be connected to sources of all second switch transistors 213 in the same column. The signal output unit 230 may respectively receive light-sensing signals from the light sensor transistors 214 in the light-sensing pixels 210s via the light-sensing data lines, process the light-sensing signals, and output digital data signals. The data driver 240 may include the plurality of image data lines Source-Data in a column direction. Each of the image data lines may be connected to all display pixels 210 in the same column. The data driver 240 may provide image signals to be displayed by the display pixel 210 via the image data lines, respectively. If the display pixel 210d may include three sub-pixels R, G, and B, the data driver 240 may include separate image data lines that may be respectively connected to the sub-pixels R, G, and B.

The reset line Reset, which may provide a reset signal for resetting the light sensor transistor 214 to each of the light-sensing pixels 110, may be interconnected between a gate of the light sensor transistor 214 of a previous row and a gate line of a next row. For example, a gate of the light sensor transistor 214 in the $n^{th}$ row may be connected to the $(n+2)^{th}$ gate line via the reset line Reset. A gate of the light sensor transistor 214 in the $(n+2)^{th}$ row may be connected to an $(n+4)^{th}$ gate line via the reset line Reset. Although FIG. 7 illustrates that a gate of the light sensor transistor 214 in an arbitrary row may be connected to the gate line of a row that may be two or more rows after, example embodiments are not so limited.

According to example embodiments, a gate of the light sensor transistor 214 in an arbitrary row may be connected to the gate line of a next row. For example, a gate of the light sensor transistor 214 in the $n^{th}$ row may be connected to the $(n+1)^{th}$ gate line via the reset line Reset, whereas a gate of the light sensor transistor 214 in the $(n+2)^{th}$ row may be connected to an $(n+3)^{th}$ gate line via the reset line Reset. To apply a reset signal to the light sensor transistor 214 in the last row, the gate driver 220 may include at least one dummy gate line that may not be connected to the second switch transistor 214 and may only be connected to the light sensor transistors 214.

The operation of the in-cell type optical touch screen apparatus 200 may be similar to that described above with reference to FIG. 5. For example, while a high voltage may be applied to the $n^{th}$ gate line, a low voltage may be applied to the remaining gate lines. As a result, all display pixels 210d in the $n^{th}$ row may display images and all light-sensing pixels 210s in the $n^{th}$ row sense incident light and may output light-sensing signals, simultaneously. While a high voltage is being applied to the $(n+1)^{th}$ gate line, a low voltage may be applied to the remaining gate lines. All display pixels 210d in the $(n+1)^{th}$ row may display images. Because the pixels 210' that may be arranged in the $(n+1)^{th}$ row may not include the light-sensing pixels 210s, no light-sensing signal may be output.

While a high voltage is being applied to the $(n+2)^{th}$ gate line, a low voltage may be applied to the remaining gate lines. All display pixels 210d in the $(n+2)^{th}$ row may display images and all light-sensing pixels 210s in the $(n+2)^{th}$ row may sense incident light and may output light-sensing signals, simultaneously. The high voltage applied to the $(n+2)^{th}$ gate line may be applied to gate of the light sensor transistors 214 in the $n^{th}$ row, and the light sensor transistors 214 in the $n^{th}$ row may be reset.

FIG. 8 is a block diagram illustrating circuit structures of in-cell type optical touch screen apparatuses according to further example embodiments. Referring to FIG. 8, an in-cell type optical touch screen apparatus 200 may include a pixel array 260, a gate driver 220, a signal output unit 230, and a data driver 240. Structures and operations of the gate driver 220, the signal output unit 230, and the data driver 240 may be identical to those described with reference to FIG. 7. The pixel array 260 shown in FIG. 8 may be identical to the pixel array 250 shown in FIG. 7, except that, in the pixel array 260, third switch transistors 215 may be in rows without a light sensor transistor 214. The pixel array 260 may include first pixels 210 with display pixels 210d, second switch transistors 213, and light sensor transistors 214 and second pixels 210" with the display pixels 210d and the third switch transistors 215. For example, as shown in FIG. 8, one first pixel 210 and one second pixel 210" may be in a row direction in the pixel array 260. However, example embodiments are not so limited and, for example, one first pixel 210 and two or more second pixels 210" may be alternately arranged in a row direction.

The second switch transistors 213 and the third switch transistors 215 may be connected in parallel and in different rows. For example, a source of the second switch transistor 213 and a source of the third switch transistor 215 may be connected to the same light-sensing data line Sensor Data, whereas a drain of the second switch transistor 213 and a drain of the third switch transistor 215 may each be connected to a source of the light sensor transistor 214. The second switch transistor 213 and the third switch transistor 215 may be connected to the light sensor transistor 214 in parallel. The gate of the second switch transistors 213 may be connected to the $n^{th}$ gate line, the $(n+2)^{th}$ gate line, the $(n+4)^{th}$ gate line, and so on, whereas the gate of the third switch transistors 215 may be connected to the $(n+1)^{th}$ gate line, the $(n+3)^{th}$ gate line, the $(n+5)^{th}$ gate line, and so on. The light sensor transistor 214 may be connected to a gate line of another row in which the second and third switch transistors 213 and 215 connected to the light sensor transistor 214 are not included. For example, a gate of the light sensor transistor 214 in the $n^{th}$ row may be connected to rows other than the $n^{th}$ row and the $(n+1)^{th}$ row (in the case of FIG. 8, the $(n+2)^{th}$ row).

While a high voltage is being applied to the $n^{th}$ gate line a low voltage may be applied to the remaining gate lines. The display pixels 210d in the $n^{th}$ row may display images and light-sensing signals may be output by the light-sensing pixels 210s' in the $n^{th}$ row via the second switch transistors 213, simultaneously. While a high voltage is being applied to the $(n+1)^{th}$ gate line, a low voltage may be applied to the remaining gate lines. The display pixels 210d in the $(n+1)^{th}$ may row display images. As the third switch transistors 215 in the $(n+1)^{th}$ row may be turned ON, light-sensing signals may be output from the light-sensing pixels 210s' in the $n^{th}$ row via the third switch transistors 215. While a high voltage is being applied to the $(n+2)^{th}$ gate line a low voltage may be applied to the remaining gate lines. The display pixels 210d in the $(n+2)^{th}$ row may display images and light-sensing signals may be output by the light-sensing pixels 210s' in the $(n+2)^{th}$ row via the second switch transistors 213, simultaneously. The high voltage applied to the $(n+2)^{th}$ gate line may be applied to gate of the light sensor transistors 214 in the $n^{th}$ row, and the light sensor transistor 214 in the $n^{th}$ row may be reset Light-sensing signals may be output from the light sensor transistors 214 in the $n^{th}$ row when a high voltage is applied to the $n^{th}$ and $(n+1)^{th}$ gate lines. Light-sensing signals may be output twice from one light sensor transistor 214, due to a memory function for retaining a light sensing result before the light sensor transistor 214 may be reset, as shown in FIG. 3. A period of time for sensing light may be doubled and light sensing may become more precise. Insufficient light sensing time in a large-sized high resolution optical touch screen apparatus driven at a high driving frequency may be compensated.

The second switch transistor 213, the third switch transistor 215, and the light sensor transistor 214 may be considered as a single light-sensing pixel 210s' that may be arranged with respect to every two display pixels 210d. Although FIG. 8 shows that one light-sensing pixel 210s' may be arranged with respect to every two display pixels 210d, it may be merely an example. For example, fourth switch transistors (not shown) connected to the second and third switch transistors 213 and 215 in parallel may be in the $(n+2)^{th}$ row. In this case, it may be considered that one light-sensing pixel 210s' may be arranged with respect to every three display pixels 210d. Light-sensing signals may be output when a high voltage is applied to the $n^{th}$ through $(n+2)^{th}$ gate lines. Light-sensing signals may be output three times from the light sensor transistor 214. The light sensor transistors 214 may be reset when a high voltage may be applied to the $(n+3)^{th}$ gate line.

In FIGS. 5-8, gates of the light sensor transistors 214 may be connected to a gate line of a next row, and thus the light sensor transistors 214 may be reset right after a light sensing operation. Example embodiments are not so limited and according to example embodiments, gates of the light sensor transistors 214 may be connected to a gate line of a previous row, and the light sensor transistors 214 may be reset right before a light sensing operation. In this case, the dummy gate line that may only be connected to the light sensor transistors 214 may be arranged before the first gate line.

While example embodiments have been particularly shown and described, it will be understood by one of ordinary skill in the art that variations in form and detail may be made therein without departing from the spirit and scope of the claims.

What is claimed is:

1. A light-sensing apparatus, comprising:
   a light-sensing pixel array including a plurality of light-sensing pixels in a plurality of rows and a plurality of columns, each of the light-sensing pixels including a light sensor transistor configured to sense light and a switch transistor configured to output a light-sensing signal from a source of the light sensor transistor; and
   a plurality of gate lines configured to apply a gate voltage to the light-sensing pixels, a gate of the light sensor transistor in a first row of the plurality of rows being connected directly to a gate line in a second row of the plurality of rows, wherein the switch transistor and the light sensor transistor are connected in series, and a drain of the light sensing transistor is connected to a driving voltage line.

2. The light-sensing apparatus of claim 1, wherein each of the gate lines is connected to a plurality of the light-sensing pixels in a same row.

3. The light-sensing apparatus of claim 1, wherein each of the gates lines is connected to gates of a plurality of the switch transistors in a same row.

4. The light-sensing apparatus of claim 1, wherein the first row is immediately adjacent to the second row.

5. The light-sensing apparatus of claim 1, wherein
at least a third row of the plurality of rows is between the first and second rows.

6. The light-sensing apparatus of claim 1, further comprising:
a gate driver configured to sequentially apply a gate voltage to the plurality of gate lines; and
a signal output unit including a plurality of data lines extending in a column direction, the signal output unit configured to receive light-sensing signals from the light-sensing pixels and output data signals.

7. The light-sensing apparatus of claim 6, wherein
each of the data lines is connected to sources of the plurality of the switch transistors in a same column.

8. The light-sensing apparatus of claim 6, wherein
a number of the plurality of gate lines is equal to a number of pixel rows of the light-sensing pixel array, and
the gate driver is connected to at least one dummy gate line, the one dummy gate line only being connected to gates of light sensor transistors.

9. The light-sensing apparatus of claim 8, wherein
the pixel rows are sequentially ordered from a first row to a last row,
one of the first and last rows includes a plurality of the light sensor transistors, and
the dummy gate line is connected to gates of the plurality of the light sensor transistors included in the one of the first and last rows.

10. The light-sensing apparatus of claim 1, wherein the light sensor transistor includes an oxide semiconductor channel layer.

11. An optical touch screen apparatus, comprising:
a pixel array including
a plurality of display pixels in a plurality of rows and columns, each of the display pixels including a display cell and a first switch transistor configured to turn the display cell ON or OFF, and
at least one light-sensing pixel in the plurality of rows and the plurality of columns, the light-sensing pixel including a light sensor transistor configured to sense light and a second switch transistor configured to output a light-sensing signal from a source of the light sensor transistor; and
a plurality of gate lines extending in a row direction and configured to apply a gate voltage to the display pixels and the light-sensing pixel, a gate of the light sensor transistor in a first row of the plurality of rows being connected directly to a gate line in a second row of the plurality of rows, wherein the second switch transistor and the light sensor transistor are connected in series, and a drain of the light sensor transistor is connected to a driving voltage line.

12. The optical touch screen apparatus of claim 11, further comprising:
a gate driver configured to sequentially apply a gate voltage to the plurality of gate lines;
a signal output unit including a plurality of data lines extending in a column direction, the signal output unit configured to receive light-sensing signals from the light-sensing pixels and output data signals; and
a data driver including a plurality of image data lines extending in the column direction and configured to apply image signals to the display pixels.

13. The optical touch screen apparatus of claim 11, wherein
each of the gate lines is connected to a plurality of display pixels and a plurality of the light-sensing pixels in a same row.

14. The optical touch screen apparatus of claim 11, wherein
each of the gates lines is connected to gates of a plurality of the first and second switch transistors in a same row.

15. The optical touch screen apparatus of claim 11, wherein the first row is immediately adjacent to the second row.

16. The optical touch screen apparatus of claim 11, wherein
at least a third row of the plurality of rows is between the first and second rows.

17. The optical touch screen apparatus of claim 11, further comprising:
at least one dummy gate line that is only connected to gates of the light sensor transistors.

18. The optical touch screen apparatus of claim 17, wherein
the pixel rows are sequentially ordered from a first row to a last row,
one of the first and last rows includes a plurality of the light sensor transistors, and
the dummy gate line is connected to gates of the plurality of the light sensor transistors included in the one of the first and last rows.

19. The optical touch screen apparatus of claim 11, wherein
the pixel array includes a plurality of first pixels including one of the display pixels and one of the light-sensing pixels and a plurality of second pixels including one of the display pixels and none of the light-sensing pixels.

20. The optical touch screen apparatus of claim 19, wherein the first pixels and the second pixels are alternated in a row direction.

21. An optical touch screen apparatus, comprising:
a pixel array including
a plurality of display pixels in a plurality of rows and columns, each of the display pixels including a display cell and a first switch transistor configured to turn the display cell ON or OFF, and
at least one light-sensing pixel in the plurality of rows and the plurality of columns, the light-sensing pixel including a light sensor transistor configured to sense light, and second and third switch transistors each configured to output a light-sensing signal from a source of the light sensor transistor; and
a plurality of gate lines extending in a row direction and configured to apply a gate voltage to the display pixels and the light-sensing pixel, a gate of the light sensor transistor in a first row of the plurality of rows being connected directly, to a gate line in a second row of the plurality of rows, wherein the second switch transistor and the third switch transistor are each connected in series with the light sensor transistor, and a drain of the light sensor transistor is connected to a driving voltage line.

22. The optical touch screen apparatus of claim 21, wherein
each of the gate lines is connected to a plurality of display pixels and a plurality of the light-sensing pixels in a same row.

23. The optical touch screen apparatus of claim 21, wherein the pixel array includes at least one first array pixel including a first display pixel of the display pixels, the second switch transistor, and the light sensor transistor; and at least one second array pixel including a second display pixel of the display pixels and the third switch transistor.

24. The optical touch screen apparatus of claim 23, wherein the first array pixels and the second array pixels alternate in a row direction.

25. The optical touch screen apparatus of claim 23, wherein gate lines corresponding to rows including the first array pixels are connected to gates of at least one of the first switch transistors and at least one of the second switch transistors, and gate lines corresponding to rows including the second array pixels are connected to gates of at least one of the first switch transistors and at least one of the third switch transistors.

26. The optical touch screen apparatus of claim 21, wherein the second switch transistor and the third switch transistor are in different rows.

27. The optical touch screen apparatus of claim 26, wherein the second row does not include one of the second and third switch transistors which are connected in series with the light sensor transistors in the first row.

28. The optical touch screen apparatus of claim 21, further comprising:

at least one dummy gate line that is only connected to one or more light sensor transistors.

29. The optical touch screen apparatus of claim 28, wherein gates of the light sensor transistors of one of a first and a last one of the light-sensing pixels arranged in a row direction in the pixel array are connected to the dummy gate line.

* * * * *